US008452840B2

(12) United States Patent
Accapadi et al.

(10) Patent No.: US 8,452,840 B2
(45) Date of Patent: May 28, 2013

(54) E-MAIL RESPONSE TIME ESTIMATION ON COMPOSE OR SEND

(75) Inventors: Jos Manuel Accapadi, Austin, TX (US); Patrick Harney, Liberty Hill, TX (US)

(73) Assignee: International Business Machines Corporation, Armonk, NY (US)

( * ) Notice: Subject to any disclaimer, the term of this patent is extended or adjusted under 35 U.S.C. 154(b) by 886 days.

(21) Appl. No.: 12/176,665

(22) Filed: Jul. 21, 2008

(65) Prior Publication Data

US 2010/0017484 A1 Jan. 21, 2010

(51) Int. Cl.
*G06F 15/16* (2006.01)
(52) U.S. Cl.
USPC .......................................................... 709/206
(58) Field of Classification Search
USPC .......................................................... 709/206
See application file for complete search history.

(56) References Cited

U.S. PATENT DOCUMENTS

| 2004/0039630 A1 | 2/2004 | Begole |
| 2004/0243679 A1 | 12/2004 | Tyler |
| 2005/0010509 A1* | 1/2005 | Straub .............................. 705/35 |

\* cited by examiner

*Primary Examiner* — Wing F Chan
*Assistant Examiner* — David X Yi
(74) *Attorney, Agent, or Firm* — Yee & Associates, P.C.; David A. Mims, Jr.

(57) ABSTRACT

An e-mail application calculates a dynamic estimate of an e-mail response time. A recipient address module, a status module, a processing module, and a presentation module interact to generate a first and a second estimated response time. The first estimated response time is determined from sender side data. The second estimated response time is generated using recipient mailbox status data after the e-mail is received by the recipient. The second estimated response time is used to dynamically update the estimated response time displayed to the sender.

14 Claims, 6 Drawing Sheets

E-MAIL RESPONSE TIME ESTIMATION ON COMPOSE OR SEND

FIELD OF THE INVENTION

The present invention relates generally to e-mail communications and specifically to providing e-mail senders with estimated e-mail response times upon composition, transmission or receipt of the e-mail by the e-mail recipient.

BACKGROUND OF THE INVENTION

In today's competitive environment, many organizations adopt various strategies to effectively communicate with their clients or customers. Often, the success of an organization with a diverse employee base and/or a large customer base depends on how effective the communication is both within and outside the organization. Much of the business world relies on communication between individuals who are geographically apart, making organization and participation in in-person meetings both time-consuming and expensive. Organizations utilize various modes of communication including paper communication, telephone communication, e-mails, and various other web-based communications. While paper communications, such as postal communications, are time consuming, telephone communications lack the benefit of having tangible records of such communications.

Consequently, e-mail communication has rapidly become one of the most widely accepted modes of communication by the business community. E-mail communication provides a near-instantaneous delivery of information at little cost and conveniently disposes of transmission delays traditionally imposed by geographical constraints. In addition, e-mails can also be used to simultaneously communicate with a large number of users by the draft of a single message sent to multiple users at the same time.

The low cost and ease of e-mail communication encourages unnecessary or irresponsible messaging. Another problem is that an e-mail spammer may easily send thousands of e-mail messages to random recipients. The ease of e-mail communication may result in a deluge of messages in a user's in-box. Often, the sheer volume of e-mails may impede or delay the recipient's ability to respond. Consequently, the sender of an e-mail does not know when to expect a response.

Currently, some e-mail systems enable a sender to receive a receipt notification or auto-response when their message has been opened. However, these systems operate only upon the opening of the e-mail by the recipient and do not alert the e-mail sender of the status of the e-mail if the e-mail is not opened. Such systems do not provide the e-mail sender with any estimate of the response time from the recipient of their e-mail.

Several factors influence a recipient's ability to respond to a received e-mail. For example, if there are too many unread messages in the recipient's mailbox, it might take the recipient longer to respond to a particular message. Similarly, the location of a sender's e-mail in the queue within the recipient's mailbox may also affect the response time. As one would expect, these factors are constantly changing. Mere reliance on the time a recipient took to respond to the sender's prior e-mail may not be a sufficient estimate of e-mail response time to a subsequent e-mail.

Thus, a need exists in the art for a way to provide an e-mail sender with a dynamic estimate of a recipient's response time that accounts for multiple factors to create a more accurate response time estimate.

SUMMARY OF THE INVENTION

An E-mail Response Time Program (ERTP) provides the sender of an e-mail with a dynamic estimate of the time required for the recipient's response by calculating a first response time estimate and a second response time estimate. The ERT comprises a recipient address module, a status module, a processing module, and a presentation module. The recipient's address is first identified by the recipient address module. The status module accesses the recipient's past and then current response time data for that recipient from a sender-side server. The processing module calculates a first estimated response time for the recipient using the sender-side status data for the recipient. The presentation module presents the first estimated response time to the sender before the message is sent. When the e-mail is transmitted and received by the recipient, the processing module queries a recipient-side server for status data about the recipient's mailbox. The processing module calculates a second estimated response time using the recipient mailbox data about the recipient's mailbox. The first and second estimated response times are used to dynamically update the estimated the e-mail response time for the recipient of a particular message. The presentation module presents the updated response time estimate to the sender after the message is sent.

BRIEF DESCRIPTION OF DRAWINGS

The novel features believed characteristic of the invention are set forth in the appended claims. The invention itself, as well as a preferred mode of use, further objectives, and advantages thereof, will be understood best by reference to the following detailed description of an illustrative embodiment when read in conjunction with the accompanying drawings, wherein:

DETAILED DESCRIPTION OF THE PREFERRED EMBODIMENT

The principles of the present invention are applicable to a variety of computer hardware and software configurations. The term "computer hardware" or "hardware," as used herein, refers to any machine or apparatus that is capable of accepting, performing logic operations on, storing, or displaying data, and includes without limitation processors and memory. The term "computer software" or "software," refers to any set of instructions operable to cause computer hardware to perform an operation. A "computer," as that term is used herein, includes without limitation any useful combination of hardware and software, and a "computer program" or "program" includes without limitation any software operable to cause computer hardware to accept, perform logic operations on, store, or display data. A computer program may, and often is, comprised of a plurality of smaller programming units, including without limitation subroutines, modules, functions, methods, and procedures. Thus, the functions of the present invention may be distributed among a plurality of computers and computer programs. The invention is described best, though, as a single computer program that configures and enables one or more general-purpose computers to implement the novel aspects of the invention. For illustrative purposes, the inventive computer program will be referred to as the E-mail Response Time Program ("ERTP").

Figure 1A:
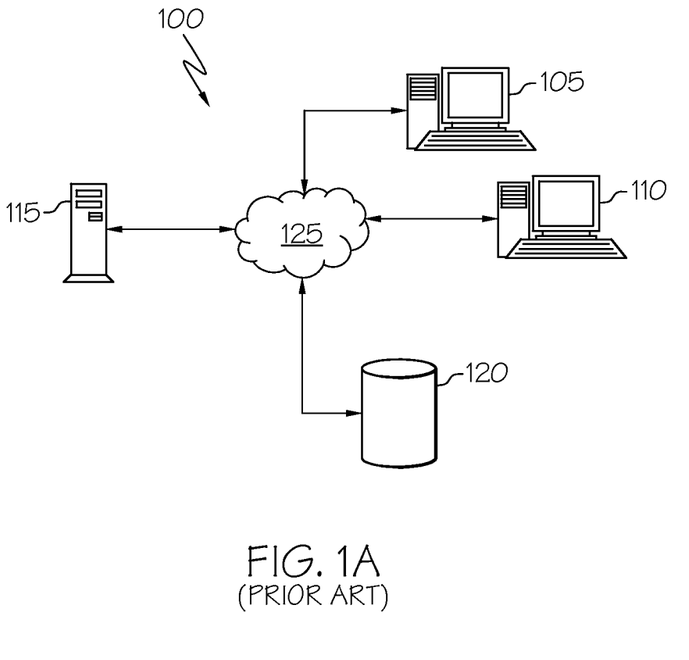
FIG. 1A depicts a computer network system.
Figure 1B:
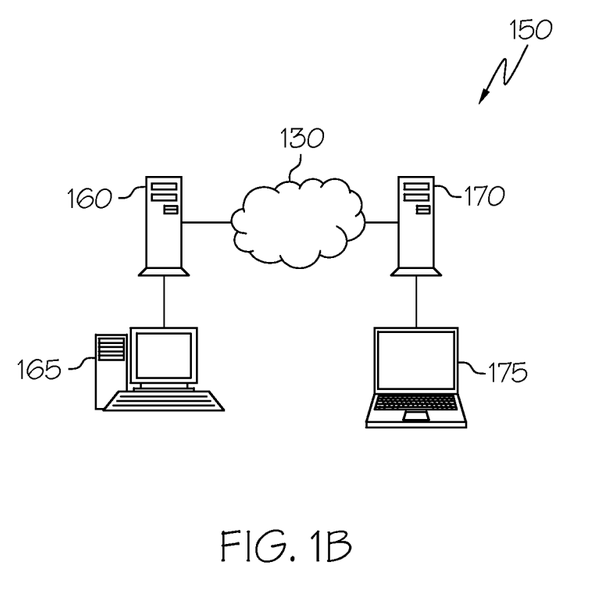
FIG. 1B depicts the transmission of information between an e-mail sender and an e-mail recipient.

The ERTP is described below with reference to an exemplary network of hardware devices, as depicted in FIG. 1A and FIG. 1B. A "network" comprises any number of hardware devices coupled to and in communication with each other through a communications medium, such as the Internet. A "communications medium" includes without limitation any physical, optical, electromagnetic, or other medium through which hardware or software can transmit data. For descriptive purposes, exemplary network 100 has only a limited number of nodes, including nodes for workstation computer 105, workstation computer 110, server computer 115, and persistent storage 120. Network connection 125 comprises all hardware, software, and communications media necessary to enable communication between network nodes 105-120. Unless otherwise indicated in context below, all network nodes use publicly available protocols or messaging services to communicate with each other through network connection 125.

An exemplary e-mail system 150 is depicted in FIG 1B. A sender-side server 160 is in communication with one or more workstations 165 through a network as illustrated in FIG. 1A above. The sender-side server 160 communicates over a network connection 130 with a recipient-side server 170. The recipient-side server 170 is in communication with one or more workstations 175 through a network as also illustrated in FIG. 1A. A sender of an e-mail composes an e-mail message using workstation 165 for sending to a recipient using workstation 175. Historical status data about a recipient is available through the sender-side server 160 as described below. Current status data about a recipient's mailbox is available through the recipient-side server 170. It is understood that the both the sender-side and the recipient-side servers may be consolidated in a single computer system. In such a consolidated e-mail system, the sender and recipient workstations may be different clients of a single computer system as illustrated in FIG. 1A. Examples of such consolidated e-mail systems include the Microsoft Exchange™ and the Lotus Domino™ e-mail server systems.

Figure 2:
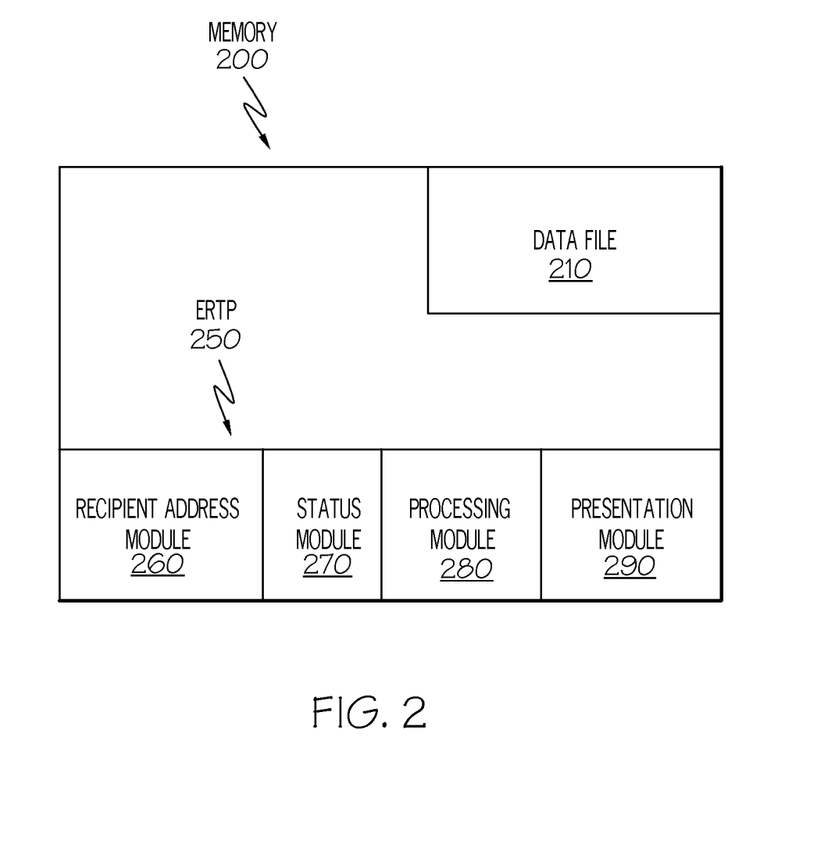
FIG. 2 depicts a computer memory containing an E-mail Response Time Program and data files.

ERTP 250, typically stored in a memory, is represented schematically in memory 200 in FIG. 2. The term "memory," as used herein, includes without limitation any volatile or persistent medium, such as an electrical circuit, magnetic disk, or optical disk, in which a computer can store data or software for any duration. A single memory may encompass and be distributed across a plurality of media. Further, ERTP 250 may reside in more than one memory distributed across different computers, servers, logical partitions, or other hardware devices. The elements depicted in memory 200 may be located in or distributed across separate memories in any combination, and ERTP 250 may be adapted to identify, locate, and access any of the elements and coordinate actions, if any, by the distributed elements. Thus, FIG. 2 is included merely as a descriptive expedient and does not necessarily reflect any particular physical embodiment of memory 200. As depicted in FIG. 2, though, memory 200 may include additional data and programs. Of particular import to ERTP 250, memory 200 includes a data file 210, a recipient address module 260, a status module 270, a processing module 280, and a presentation module 290.

ERTP 250 discloses a method and e-mail application system for providing an e-mail sender with dynamic estimates of an e-mail response time for the recipient. The sender may use these estimates in deciding whether an alternate or additional form of communication should be considered, for example, a telephone call or letter by postal service.

Figure 3:
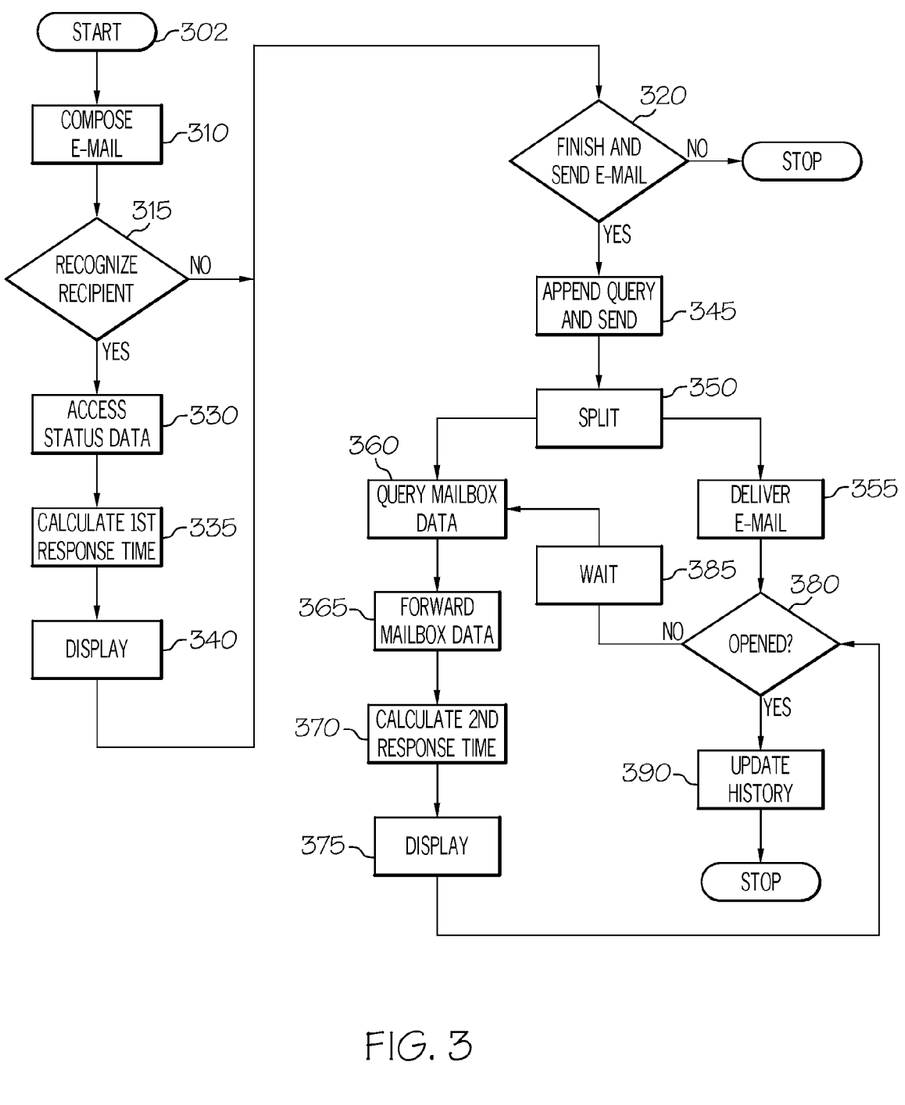
FIG. 3 illustrates an exemplary E-mail Response Time Program method and system.

An embodiment of ERTP 250 performs the steps illustrated in FIG. 3. ERTP 250 starts (302) and determines whether a user has begun to compose an e-mail (310). When a user has begun to compose an e-mail, ERTP 250 attempts to identify the recipient's address from the address field using the recipient address module 260 (315). As the sender begins to fully insert the recipient's address into the address field, ERTP 250 determines whether the recipient's address can be identified due to prior usage (315). If not, ERTP 250 awaits the completion of the e-mail, or a decision to abandon the e-mail (320). The address field may include any of the "To," Carbon Copy ("CC"), and Blind Carbon Copy ("BCC") fields.

If the recipient address module recognizes a recipient 260 (315), the ERTP 250 status module accesses the corresponding sender-side status data for that particular recipient 270 (330). The sender-side status data may include, without limitation, the historical and then current response times of the recipient to previous e-mail messages. The sender-side status data may also include data regarding the nature and content of the e-mail's Subject field, address fields, and/or text within the body of the sender's e-mail. Aside from the historical data associated with that particular recipient, ERTP 250 also dynamically incorporates new or recent response times from that recipient within the sender-side status data 270 (390).

Using the sender-side status data, the ERTP 250 processing module calculates a first estimated response time for the recipient 280 (335). Based on the sender's preference, the processing module 280 may include or exclude certain parameters in determining the first estimated response time. Such parameters could be, for example, the CC: or BCC fields, the Subject field, or the actual text within the body of the e-mail. Using information from the sender-side status data, the processing module 280 may also calculate estimates for the minimum, maximum, and average response times for a particular recipient.

ERTP 250 presents the first estimated response time to the sender (340) as a pop-up or similar message through a presentation module 290. The presentation module 290 may provide the first estimated response time before the sender completes the composition of the e-mail message, thereby enabling the sender to anticipate a delayed response before drafting the body of the message. The first response time estimate may appear next to the recipient's address in a compose e-mail window such as window 400 illustrated in FIG. 4 below. The first estimated response time is available for a display to the user as soon as the recipient's address is recognized during the composition of the e-mail message (315). If the recipient's address is not recognized, ERTP 250 will not display a first estimated response time, and the composition of the e-mail will continue until the e-mail message is either completed by the user and sent, or terminated (320).

When the e-mail is sent, the processing module 280 also appends a mailbox status query to the sender's e-mail and forwards the e-mail with the query to the recipient-side server (345). Upon receipt of the e-mail message and query by the recipient-side server, the e-mail and the query are split (350). The recipient mailbox status data is accessed in response to the query (360). The e-mail is delivered to the recipient mailbox (355). The recipient mailbox status data is automatically forwarded to the processing module 280 (365). The recipient-mailbox status data may include various dynamic characteristics associated with the e-mails in the recipient's e-mailbox. For example, the recipient mailbox status data may include real time information about the total number of e-mails, the total number of unread e-mails, or the location of sender's e-mail in the queue of e-mails in recipient's mailbox. The recipient mailbox status data may also include information regarding the nature and content of the e-mail's Subject field, address fields, and/or text within the body of the sender's e-mail. The generation of recipient mailbox status data does not require the recipient to open or read the sender's e-mail because the recipient mailbox status data is readily available wherever the sending and receiving e-mail servers are consolidated into a single e-mail system. Such consolidation is typical of a business wide e-mail system. If the sending and receiving e-mail servers support separate e-mail systems, the recipient mailbox status data will either be unavailable, or suitable permissions or programming will be required on the recipient-side server as will be known to those skilled in the art.

Using the recipient mailbox status data, the processing module 280 calculates a second estimated response time (370). The second estimated response time is based on real time data about the e-mails in recipient's mailbox collected by the processing module 280 as described above. The processing module may also provide estimates for the minimum, maximum and average response times for that particular recipient. A single program may be used by the processing module to calculate both the first estimated response time (335) and the second estimate response time (370), or separate programs may be used.

After receipt of the e-mail message by the recipient and calculation of the second estimated response time by the processing module 280 (370), the second estimated response time is displayed to the sender (375). The second estimated response time may appear in the sender's "sent mail" box as illustrated by way of example in FIG. 5. The second estimated response time may also be provided to the status module 270 for inclusion with other status information for the recipient. The calculation of the second estimated response time may be periodically repeated until the e-mail is opened (380) to dynamically update the second estimated response time as the data changes or ages. When the e-mail is opened (380) the second estimated response time display is cleared, and the sender-side status data is updated (390).

Figure 4:
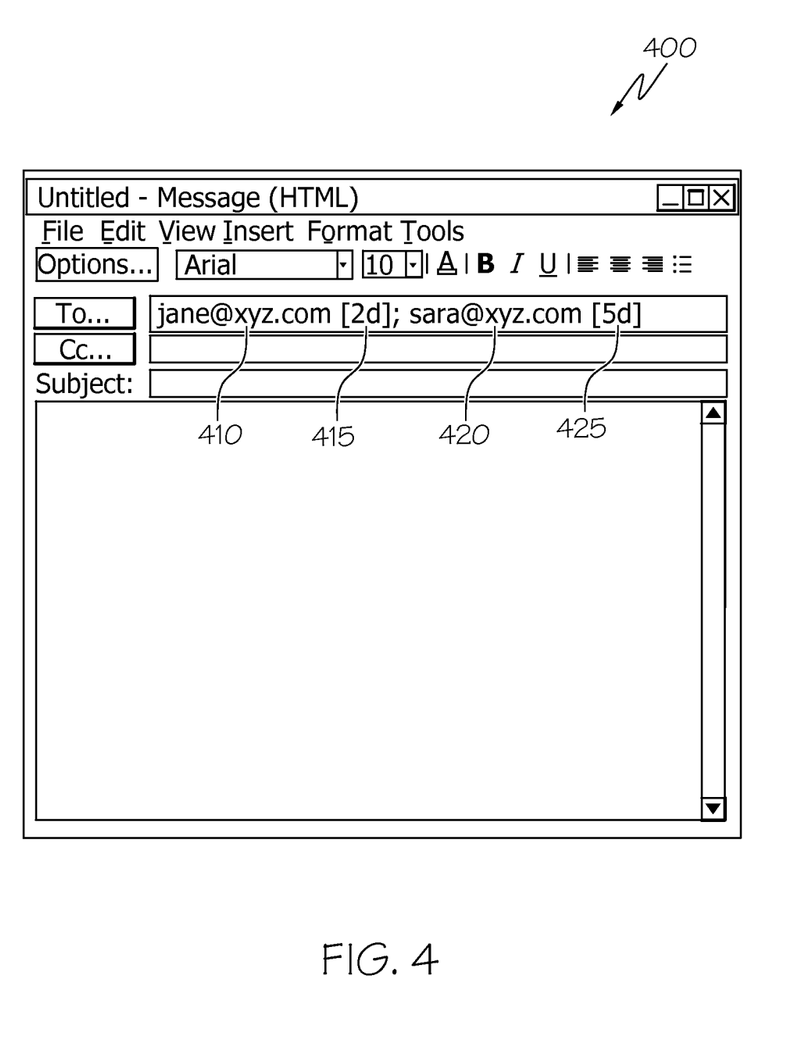
FIG. 4 depicts an example screen display of a first estimated response time prior to sending an e-mail message.

In the embodiment depicted in FIG. 4, the presentation module 290 may provide the first estimation of response time before the sender sends the message. In this embodiment, a first response time 415 appears beside a first recipient 410, and a second response time 425 appears beside a second recipient 420 in the address field of a compose e-mail window 400. Based on this information, the sender may decide whether to consider alternative means of communication. If ERTP 250 is unable to detect pre-existing recipient status data, the estimated response time display will be empty or non-existent.

Figure 5:
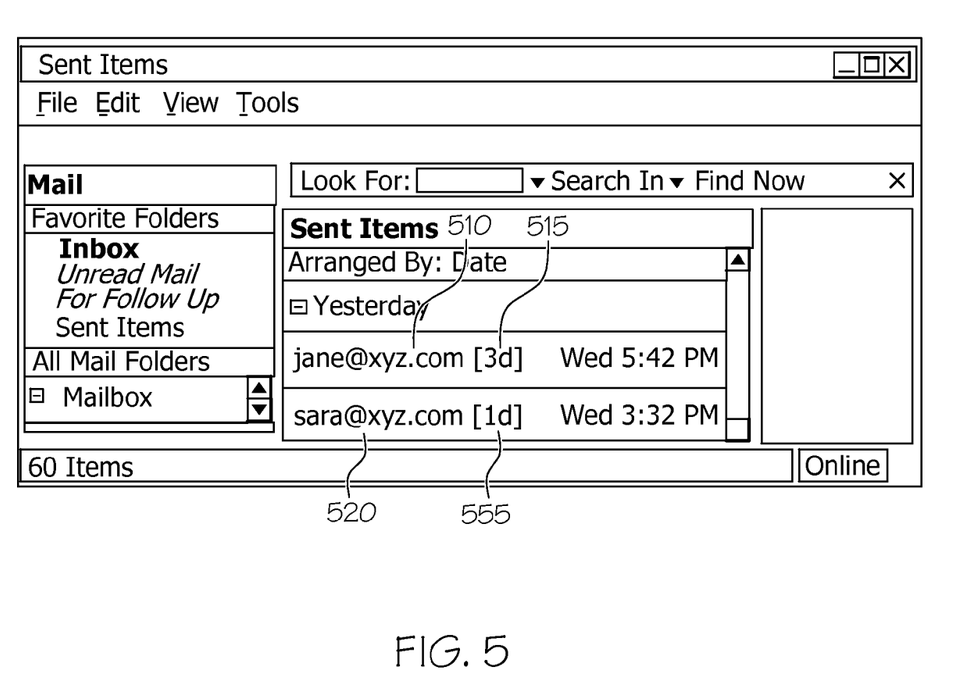
FIG. 5 depicts an example screen display of an updated estimated response time after sending an e-mail message.

In an embodiment depicted in FIG. 5, the presentation module 290 may display the second estimated response time after the sender sends the message. In this embodiment, a first response time 515 appears beside a first recipient 510, and a second response time 525 appears beside a second recipient 520 in a sent mail folder 500. This response time estimate enables the sender to determine whether, for example, a follow-up call may be warranted.

With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. The novel spirit of the present invention is still embodied by reordering or deleting some of the steps contained in this disclosure. The spirit of the invention is not meant to be limited in any way expect by proper construction of the following claims.

What is claimed is:

1. A computer program product for providing a sender of an e-mail with a dynamic estimate of a response time interval, comprising:
   a memory;
   a program stored in the memory comprising:
      a recipient address module for accessing a recipient e-mail address from an address field of an e-mail during a composition of the e-mail;
      a status module in communication with the recipient address module for accessing a first status data corresponding to the recipient e-mail address, wherein the first status data includes a past recipient e-mail response time stored on a sender-side server;
      a processing module in communication with the status module for calculating a first estimated response time using the first status data, appending a status inquiry to the e-mail, and transmitting the e-mail, and the status inquiry, to a recipient server, wherein a delivery of the e-mail and the status query causes a second status data to be generated and communicated to the processing module for calculating a second estimated response time, wherein the second estimated response time enables a determination of whether to send a follow up message after sending the e-mail and wherein the first estimated response time enables a determination of whether to use an alternative form of communication with an intended recipient of the e-mail before sending the e-mail, wherein the second status data includes an unread message count associated with the recipient e-mail address, a total message count associated with the recipient e-mail address, and a location of the e-mail in a queue of e-mails associated with the recipient e-mail address, wherein the processing module periodically receives updated data regarding the second status data in response to the status query, wherein the updated data includes changes to the second status data, and wherein the processing module dynamically modifies the second estimated response time over time based on the updated data; and
      a presentation module in communication with the processing module for presenting the first estimated response time to the sender in a window on a display of the sender as soon as the recipient e-mail address is recognized in the address field during the composition of the e-mail, and for displaying the second estimated response time including modifications to the second estimated response time over time based on the updated data to the sender after the e-mail has been delivered to the recipient, receiving an e-mail response from the recipient, calculating an actual response time for the e-mail response and updating the past recipient e-mail response time with the actual response time.

2. The computer program product of claim 1, wherein the first estimated response time is transmitted to the sender as a pop-up window, or as a message, and displayed next to the recipient e-mail address in the address field of the e-mail.

3. The computer program product of claim 1, wherein using the first status data, the processing module calculates a minimum response time estimate, a maximum response time estimate, and an average response time estimate for a particular recipient, and wherein the first estimated response time comprises the minimum response time estimate, the maximum response time estimate, and the average response time estimate for the particular recipient.

4. The computer program product of claim 1, wherein using the second status data, the processing module calculates a minimum response time estimate, a maximum response time estimate, and an average response time estimate for a particular recipient.

5. The computer program product of claim 3, wherein the processing module includes information contained in a CC field, a BCC field, a Subject field, or a body of the e-mail in determining the first estimated response time.

6. The computer program product of claim 3, wherein the processing module excludes information contained in a CC field, a BCC field, a Subject field, or a body of the e-mail in determining the first estimated response time.

7. A programmable apparatus for providing a sender of an e-mail with a dynamic estimate of a response time interval, comprising:
  a programmable hardware connected to a memory;
  a program stored in the memory comprising:
    a recipient address module for accessing a recipient e-mail from an address field of an e-mail during a composition of the e-mail;
    a status module in communication with the recipient address module for accessing a first status data corresponding to the recipient e-mail address, the status data comprising a past recipient e-mail response time stored on a sender-side server;
    a processing module in communication with the status module for calculating a first estimated response time using the first status data, appending a status inquiry to the e-mail, and transmitting the e-mail, and the status inquiry, to a recipient server, wherein a delivery of the e-mail and the status query causes a second status data to be generated and communicated to the processing module for calculating a second estimated response time, wherein the second estimated response time enables a determination of whether to send a follow up message after sending the e-mail and wherein the first estimated response time enables a determination of whether to use an alternative form of communication with an intended recipient of the e-mail before sending the e-mail, wherein the second status data includes an unread message count associated with the recipient e-mail address, a total message count associated with the recipient e-mail address, and a location of the e-mail in a queue of e-mails associated with the recipient e-mail address, wherein the processing module periodically receives updated data regarding the second status data in response to the status query, wherein the updated data includes changes to the second status data, and wherein the processing module dynamically modifies the second estimated response time over time based on the updated data; and
    a presentation module in communication with the processing module for displaying the first estimated response time to the sender in a window on a display of the sender as soon as the recipient e-mail address is recognized in the address field during the composition of the e-mail, and for displaying the second estimated response time including modifications to the second estimated response time over time based on the updated data to the sender after the e-mail has been delivered to the recipient, receiving an e-mail response from the recipient, calculating an actual response time for the e-mail response and updating the past recipient e-mail response time with the actual response time.

8. The programmable apparatus of claim 7, wherein using the first status data, the processing module calculates a minimum response time estimate, a maximum response time estimate, and an average response time estimate for a particular recipient, and wherein the first estimated response time comprises the minimum response time estimate, the maximum response time estimate, and the average response time estimate for the particular recipient.

9. The programmable apparatus of claim 7, wherein the program contains instructions for causing the programmable hardware to perform steps comprising:
  using the second status data, the processing module calculates estimates for a minimum, a maximum, and an average response time for a particular recipient.

10. The programmable apparatus of claim 7, wherein the first status data further comprises an information contained in a CC field, a BCC field, a Subject field, or a body of the e-mail.

11. A computer implemented process for providing a sender of an e-mail with a dynamic estimate of a response time interval, comprising:
  receiving a recipient e-mail address entered in an address field of an e-mail during a composition of the e-mail;
  accessing a first status data corresponding to the recipient e-mail address, the first status data comprising a past recipient e-mail response time stored on a sender-side server;
  calculating, by a processing unit, a first estimated response time using the first status data;
  displaying the first estimated response time to the sender in a window on a display of the sender as soon as the recipient e-mail address is recognized in the address field during the composition of the e-mail;
  appending a status inquiry to the e-mail;
  transmitting the e-mail and the status inquiry to a recipient server, wherein the status inquiry requests a second status data from the recipient server, the second status data comprising an unread message count associated with the recipient e-mail address, a total message count associated with the recipient e-mail address, and a location of the e-mail in a queue of e-mails associated with the recipient e-mail address;
  responsive to transmitting the e-mail and the status inquiry to the recipient server, receiving the second status data from the recipient server;
  calculating a second estimated response time based on the second status data, wherein the second estimated response time enables a determination of whether to send a follow up message after sending the e-mail and wherein the first estimated response time enables a determination of whether to use an alternative form of communication with an intended recipient of the e-mail before sending the e-mail;
  displaying the second estimated response time to the sender;
  periodically receiving updated data regarding the second status data in response to the status query, wherein the updated data includes changes to the second status data;
  dynamically modifying the second estimated response time over time based on the updated data;

displaying the second estimated response time including modifications to the second estimated response time over time based on the updated data to the sender after the e-mail has been delivered to the recipient;

receiving an e-mail response from the recipient, and calculating an actual response time for the e-mail response; and updating the past recipient e-mail response time with the actual response time.

12. The computer implemented process of claim 11, wherein the first status data further comprises information contained in a CC field, a BCC field, a Subject field, or a body of the e-mail.

13. The computer implemented process of claim 11 further comprising:

transmitting the first estimated response time to the sender as a pop-up window, or as a message; and displaying next to the recipient e-mail address in the address field of the e-mail.

14. The programmable apparatus of claim 7, wherein the first estimated response time is transmitted to the sender as a pop-up window, or as a message, and displayed next to the recipient e-mail address in the address field of the e-mail.

* * * * *